United States Patent
Cassidy

(10) Patent No.: US 11,468,243 B2
(45) Date of Patent: Oct. 11, 2022

(54) IDENTITY-BASED DISPLAY OF TEXT

(71) Applicant: Amazon Technologies, Inc., Reno, NV (US)

(72) Inventor: Ryan H. Cassidy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 21 days.

(21) Appl. No.: 16/459,606

(22) Filed: Jul. 1, 2019

(65) Prior Publication Data

US 2020/0034433 A1    Jan. 30, 2020

Related U.S. Application Data

(63) Continuation of application No. 13/625,547, filed on Sep. 24, 2012, now abandoned.

(51) Int. Cl.
*G06F 40/40* (2020.01)

(52) U.S. Cl.
CPC .................... *G06F 40/40* (2020.01)

(58) Field of Classification Search
CPC .............. G06T 2207/10016; G06K 9/00; B82Y 15/00; G06F 17/24; G06F 17/30
See application file for complete search history.

(56) References Cited

U.S. PATENT DOCUMENTS

| | | |
|---|---|---|
| 6,374,209 B1 | 4/2002 | Yoshimi et al. |
| 6,557,042 B1 | 4/2003 | He et al. |
| 6,963,830 B1 | 11/2005 | Nakao |
| 7,117,437 B2 | 10/2006 | Chen et al. |
| 7,162,413 B1 | 1/2007 | Johnson et al. |
| 7,302,280 B2 | 11/2007 | Hinckley et al. |
| 7,376,893 B2 | 5/2008 | Chen et al. |
| 7,451,395 B2 | 11/2008 | Brants et al. |
| 7,468,805 B2 | 12/2008 | Lo et al. |
| 7,603,435 B2 | 10/2009 | Welingkar et al. |
| 7,720,742 B1 | 5/2010 | Mauro et al. |
| 8,095,613 B1 | 1/2012 | Perkowitz et al. |
| 8,200,487 B2 * | 6/2012 | Peters ................... G06F 40/10 704/236 |
| 8,423,995 B2 | 4/2013 | Hsieh et al. |

(Continued)

FOREIGN PATENT DOCUMENTS

WO    2007/029207 A2    3/2007

*Primary Examiner* — Anne L Thomas-Homescu
(74) *Attorney, Agent, or Firm* — Pierce Atwood LLP

(57) ABSTRACT

A computing device can receive a communication including text that can be presented on a display screen of the computing device. A camera of the computing device can capture image data. The computing device can determine, from the image data, an identity represented in the image data. The computing device can determine an amount of the communication to present on the display screen based on the identity. The computing device can determine, from the image data, user attention is directed toward the display screen. The computing device can present the amount of the communication on the display screen. In some embodiments, the computing device can determine which content of the communication to display based on the identity. The computing device can display a summary of the communication. The computing device can display an amount of the summary and/or the content of the summary based on the identity.

15 Claims, 6 Drawing Sheets

(56) References Cited

U.S. PATENT DOCUMENTS

| | | | |
|---|---|---|---|
| 8,819,001 B1* | 8/2014 | Zhang | G06F 40/40 707/723 |
| 8,966,361 B2* | 2/2015 | Lee | G06F 40/106 715/236 |
| 10,120,438 B2* | 11/2018 | Osman | G06F 1/325 |
| 2002/0003547 A1 | 1/2002 | Wang et al. | |
| 2002/0138582 A1 | 9/2002 | Chandra et al. | |
| 2003/0050778 A1 | 3/2003 | Nguyen et al. | |
| 2003/0122652 A1 | 7/2003 | Himmelstein | |
| 2003/0164848 A1 | 9/2003 | Dutta et al. | |
| 2004/0029085 A1* | 2/2004 | Hu | G06F 40/258 434/178 |
| 2004/0098671 A1* | 5/2004 | Graham | G06F 16/40 715/274 |
| 2004/0111467 A1* | 6/2004 | Willis | G06F 16/9535 709/203 |
| 2004/0230415 A1 | 11/2004 | Riezler et al. | |
| 2005/0131935 A1 | 6/2005 | O'Leary et al. | |
| 2005/0154702 A1* | 7/2005 | Liu | G06F 16/93 |
| 2005/0278633 A1* | 12/2005 | Kemp | G06F 16/93 715/713 |
| 2006/0017692 A1* | 1/2006 | Wehrenberg | G06F 1/1694 700/302 |
| 2006/0029262 A1* | 2/2006 | Fujimatsu | G07C 9/37 382/117 |
| 2006/0053154 A1 | 3/2006 | Yano | |
| 2006/0133586 A1 | 6/2006 | Kasai et al. | |
| 2007/0114771 A1 | 5/2007 | Wanami et al. | |
| 2007/0143343 A1 | 6/2007 | Iverson | |
| 2007/0150451 A1* | 6/2007 | Brei | G06F 16/3328 |
| 2007/0202914 A1* | 8/2007 | Maaloe | H04M 1/72445 455/550.1 |
| 2007/0220010 A1* | 9/2007 | Ertugrul | G06F 16/9535 |
| 2007/0299859 A1 | 12/2007 | Gupta et al. | |
| 2008/0146210 A1* | 6/2008 | Somani | H04M 1/2745 455/418 |
| 2008/0270119 A1 | 10/2008 | Suzuki | |
| 2008/0287103 A1* | 11/2008 | Itou | H04M 1/72427 455/411 |
| 2008/0300872 A1 | 12/2008 | Basu et al. | |
| 2009/0006369 A1 | 1/2009 | Guday et al. | |
| 2009/0070101 A1 | 3/2009 | Masuyama et al. | |
| 2009/0084249 A1 | 4/2009 | Kemp et al. | |
| 2009/0125589 A1 | 5/2009 | Anand et al. | |
| 2009/0265666 A1 | 10/2009 | Hsieh et al. | |
| 2010/0138416 A1 | 6/2010 | Bellotti | |
| 2010/0145678 A1 | 6/2010 | Csomasi et al. | |
| 2010/0159995 A1* | 6/2010 | Stallings | H04M 1/67 345/173 |
| 2010/0174979 A1* | 7/2010 | Mansfield | G06F 40/143 715/234 |
| 2010/0240402 A1 | 9/2010 | Wickman et al. | |
| 2011/0004845 A1 | 1/2011 | Ciabarra | |
| 2011/0023128 A1 | 1/2011 | Furuya | |
| 2011/0071973 A1 | 3/2011 | Zhang | |
| 2011/0161085 A1 | 6/2011 | Boda et al. | |
| 2011/0161795 A1* | 6/2011 | Bellwood | G06F 40/166 715/210 |
| 2011/0314041 A1 | 12/2011 | Drucker et al. | |
| 2012/0042257 A1 | 2/2012 | Aftab et al. | |
| 2012/0115438 A1 | 5/2012 | Umealu | |
| 2012/0209935 A1 | 8/2012 | Harter et al. | |
| 2012/0271913 A1 | 10/2012 | Tallgren et al. | |
| 2012/0278475 A1 | 11/2012 | Papakipos et al. | |
| 2012/0288139 A1* | 11/2012 | Singhar | G06F 1/3265 382/103 |
| 2012/0290289 A1 | 11/2012 | Manera et al. | |
| 2013/0006973 A1* | 1/2013 | Caldwell | G06F 16/345 707/723 |
| 2013/0036117 A1 | 2/2013 | Fisher et al. | |
| 2013/0185411 A1 | 7/2013 | Martin | |
| 2013/0191735 A1 | 7/2013 | Kumar et al. | |
| 2013/0226559 A1* | 8/2013 | Lim | G06F 16/9535 704/9 |
| 2013/0246595 A1 | 9/2013 | O'Donoghue et al. | |
| 2013/0253910 A1 | 9/2013 | Turner et al. | |
| 2013/0268839 A1 | 10/2013 | Lefebvre et al. | |
| 2013/0297704 A1 | 11/2013 | Alberth, Jr. et al. | |
| 2013/0325481 A1 | 12/2013 | Van Os et al. | |
| 2013/0332526 A1 | 12/2013 | Hurley et al. | |
| 2013/0339425 A1 | 12/2013 | Carion et al. | |
| 2014/0047331 A1 | 2/2014 | Feldman et al. | |
| 2014/0070080 A1* | 3/2014 | Ruh | G01S 7/4813 250/216 |
| 2014/0082208 A1 | 3/2014 | Ojanpera | |
| 2014/0195252 A1 | 7/2014 | Gruber et al. | |
| 2014/0297647 A1 | 10/2014 | Shim et al. | |

* cited by examiner

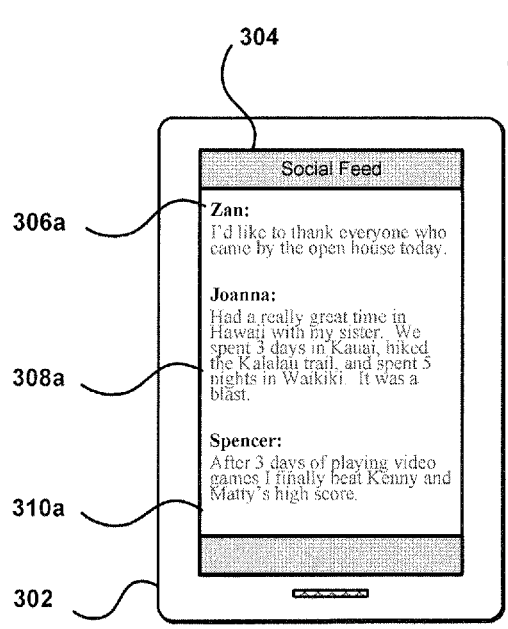
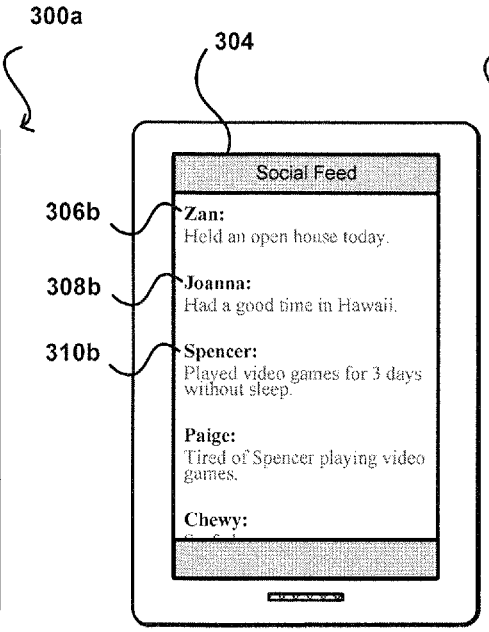
FIG. 3A  FIG. 3B
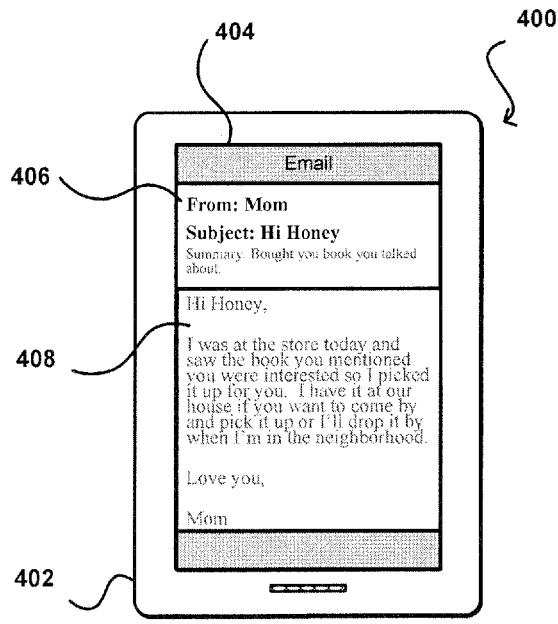
FIG. 4

IDENTITY-BASED DISPLAY OF TEXT

CROSS-REFERENCE TO RELATED APPLICATIONS

This application is a continuation of U.S. application Ser. No. 13/625,547, filed on Sep. 24, 2012, the content of which is incorporated herein by reference.

BACKGROUND

Users are increasingly relying upon various electronic and computing devices to store, track, and update various types of information and handle various types of tasks. For example, many users rely upon computing devices to compose emails and notes and input and store information, user schedules, task lists, and other such information. The types of lists, alerts, and messages often include more information than can be displayed on a display screen at any one time. Conventional approaches show a portion of the text in such a situation, but a portion of the text, such as the first two lines of an email, is often inadequate to determine a context, key points, or the main point of the text. Accordingly, users often have to take time to open and read a message to determine whether it contains anything important, which can be time consuming and can distract the user from performing other tasks. As technology advances and as people are increasingly using and relying on computing devices in a wider variety of ways, it can be advantageous to adapt the ways in which information is presented to users and the ways in which users access the same.

BRIEF DESCRIPTION OF THE DRAWINGS

Various embodiments in accordance with the present disclosure will be described with reference to the drawings, in which:

FIGS. 3A and 3B illustrate example screen shots of a news feed for a social network displayed on a computing device in accordance with at least one embodiment;

FIG. 4 illustrates an example email in accordance with at least one embodiment;

DETAILED DESCRIPTION

Figures 1A, 1B:
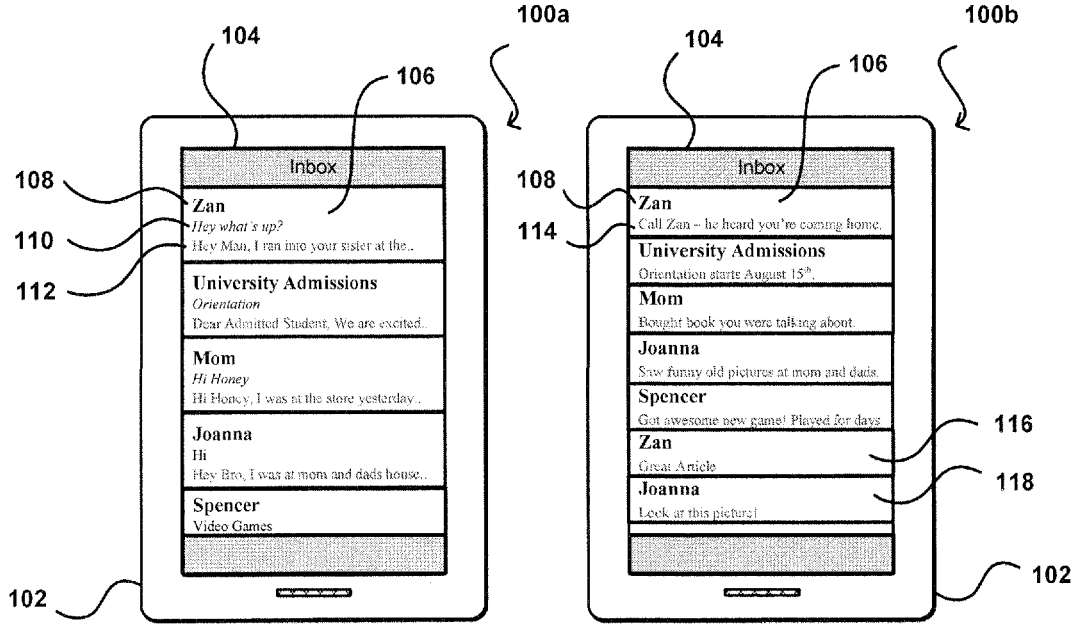
FIGS. 1A and 1B illustrate example screen shots of an email inbox displayed on a computing device in accordance with at least one embodiment.

Systems and methods in accordance with various embodiments of the present disclosure may overcome one or more of the aforementioned and other deficiencies experienced in conventional approaches to presenting information via a computing device. In particular, various approaches can generate and provide summaries of information for display on a display screen or other such element of a computing device. In various embodiments, a body of text can be summarized, with the amount by which the body of text is summarized being determined based in part by the amount of presentable or displayable area available on a particular device, application, or combination thereof. For example, a two page email can be condensed or truncated in a first summarization to a single line to display in an email inbox view and a second summarization condensing the email to four lines could be generated to display as a header or introduction of the email to highlight key points, dates, times, or other information associated with a set of keywords singled out as having a particular importance or relevance.

Text summarization involves reducing a body of text into a short set of words, phrases, or a paragraph that convey the main point of the text. In at least one embodiment, text summaries are generated by analyzing a body of text to identify keywords from a library of action words associated with topics, such as dates, action required, friends, family, events, and so on. The action words include a predetermined rank and are weighted by importance or relevance to these and other topics. For example, this ranking can be based on a global ranking as determined by text mining large sources of textual information. The ranking can be based on text mining communications of the user, thereby determining a local or personalized ranking for the user. Or the action words can incorporate a ranking that includes a combination of global and local action word rankings. This ranking may change over time as life changes and new interests evolve for a particular user. Once keywords are identified, a relative ranking of the identified keywords is determined for the body of text based in part on the rank or weighting associated with each identified keyword from the library of action words. Subsequently, a summary is generated using the ranked identified keywords according to a text summary algorithm. This method of text summarization is known as an extractive method because the method selects a subset of existing words, phrases, or sentences from the original text and reduces the same down to those words, phrases, or sentences to form the summary. Abstractive text summarization methods can also be used, in accordance with various embodiments. Abstractive methods build an internal semantic representation of the body of text and subsequently use natural language generation algorithms to generate the summaries. These methods tend to be closer to natural human language and often contain words not explicitly present in the original body of text. Extraction methods tend to copy the information deemed most important by the system or algorithm to the summary, such as keyword or phrases, while abstraction methods involve paraphrasing sections of the body of text. Various other interaction and execution approaches can be utilized as well or in combination within the scope of the various embodiments.

Various other functions and advantages are described and suggested below as may be provided in accordance with the various embodiments.

FIGS. 1(a) and 1(b) illustrate example screen shots (100a and 100b) of a computer device 102, in accordance with at least one embodiment. Although a smart phone is shown, it should be understood that various other types of electronic or computing devices that are capable of determining and processing input can be used in accordance with various embodiments discussed herein. These devices can include, for example, notebook computers, desktop computers, tablet computers, personal data assistants, electronic book readers, video gaming consoles or controllers, televisions or smart televisions, and portable media players, among others. As mentioned above, devices, such as smartphones and tablet computers, have limited display screen area, therefore it is desirable to present information to users in as an efficient manner as possible. FIG. 1(a) illustrates an example screen shot 100a of an email inbox 104. In this example, four and a partial fifth emails are displayed on a display screen of the computing device 102. The email inbox 104 includes an example email 106, with a text line for a sender 108, a subject line 110, and a first line 112 from the body of the email 106. The lack of displayable area of computing devices puts a constraint on the amount of information that can be concurrently presented to a user. Instead of displaying the first line of the email, it can be desirable to display key information associated with the email as a whole so a user can identify a subject or item without having to open and read the whole email. The first line of an email is often includes formalities not indicative or representative of the main information or point contained therein. However, a truncated version or summary of the information within the email displayed in place of the first line of the email 106 is often enough to convey the main point(s) to a user. In the event the user is interested in obtaining more information or details, the user can select the email to open and view an expanded view thereof.

FIG. 1(b) illustrates an example screen shot 100b of the email inbox 104, in accordance with at least one embodiment. In this example, seven emails are shown displayed on the display screen of the computing device 102. In this example, the email 106 includes a text line of the sender 108 or the sender's name and, in the place of the subject line 110 and the first line 112 of the email body, a textual summary 114 of the email 106. The textual summary can be generated in a number of different ways using any text summary algorithm. Thus, in this example, not only is a user able obtain a summary, or be presented with the most important content, of each email, more emails are concurrently presented to the user on the display screen.

Figures 2A, 2B:
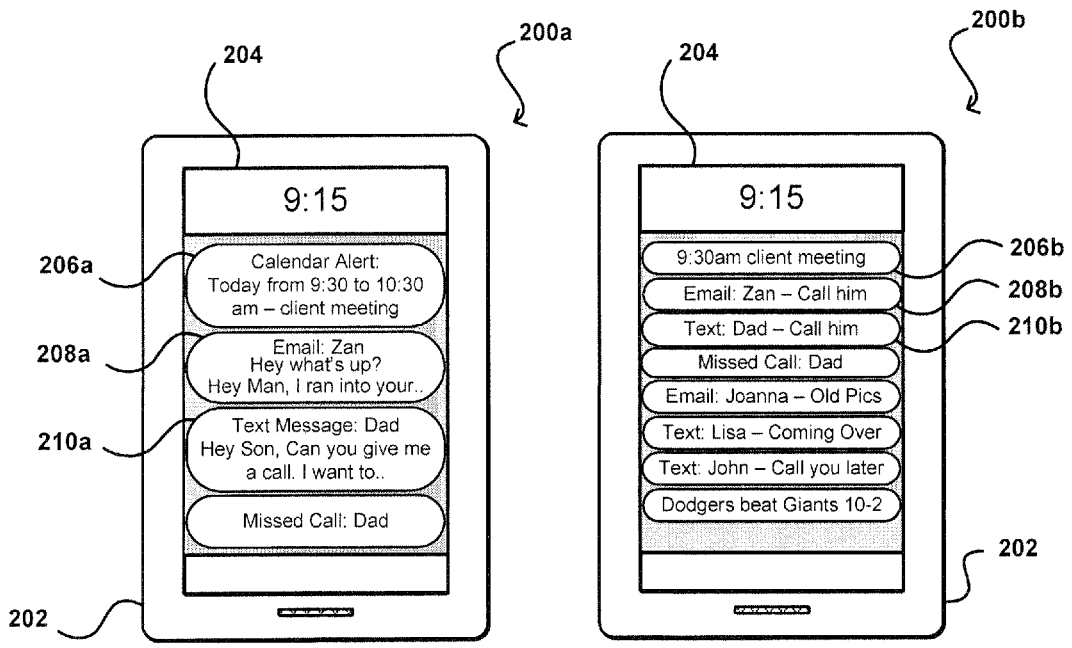
FIGS. 2A and 2B illustrate example screen shots of a lock-screen image displayed on a computing device in accordance with at least one embodiment.

FIGS. 2(a) and 2(b) illustrate another set of example screen shots (200a and 200b) of a computer device 202, in accordance with at least one embodiment. In this example, the screen shots (200a and 200b) are of a lock-screen 204. FIG. 2(a) illustrates an example lock-screen image 204 with multiple notification banners (206a, 208a, 210a) displayed thereon. In this example, notification 206a is a calendar alert, notification 208a is an email notification, and notification 210a is a text message notification. Each of these example notifications, and many other conceivable examples, displays or presents more information to a user than is generally necessary. Given the lack of displayable area on devices, such as smartphones and tablet computers, it is desirable to present information in as an efficient manner as possible. Thus, FIG. 2(b) illustrates an alternative example of presenting notification banners (206b, 208b, 210b) on a lock-screen 204. In this example, a truncated or summary version of each of the respective notification banners (206a, 208a, 210a) from FIG. 2(a) is displayed on the lock-screen 204 as notification banners (206b, 208b, 210b). In this example, key action words are chosen to be able to convey the most important information to a user. In various embodiments, not all important information can always be conveyable or displayable, but keywords hinting at the important additional information can be chosen to tip users off or allude to additional information. Additionally, in this example, four additional notification banners are displayable by truncating or summarizing the content from FIG. 2(a).

FIGS. 3(a) and 3(b) illustrate another set of example screen shots (300a and 300b) of a computer device 302, in accordance with at least one embodiment. In this example, the screen shots (300a and 300b) are of a user's social feed 304 of a social network. FIG. 3(a) illustrates the example screen shot 300a including friend status updates (306a, 308a, 310a) are displayed on the display screen of the computing device 302. Again, a lack of displayable area puts a constraint on the amount of information that can be concurrently presented to a user. As mentioned elsewhere herein, not all of this information is necessarily relevant to present to the user and can be truncated in order to accommodate more information or status updates. Therefore, FIG. 3(b) illustrates an example screen shot 300b that includes friend status updates (306b, 308b, 310b) that are summaries or truncated compared to the status updates of FIG. 3(a). In this example, truncating the status updates to only reflect key points or summaries enables an additional two entries to be concurrently displayed on screen shot 300b.

Instead of representing a social feed for a social media website, application, or other entity, FIG. 3(b) could represent a separate window or summary page provided as part of a computing device's operating system or otherwise. In this example, the computing device could pull, monitor, and/or draw information from a user's voicemail though voice transcription, various social network, news, email, messaging, and like content channels or accounts, aggregate this information, and display summaries or key phrases of events, communications, and/or updates as bullet points, for example, on the separate page or as a pull-down screen or menu. In one embodiment, such a summary page could be accessed by tilting the computing device in a determined direction to either initiate a sliding animation of the summary page coming into view or hinting at the presence of the summary page for the user to then select to be able to view. Tilting the computing device is associated with a rotation about a determined axis which can be detected using at least one of an accelerometer or gyroscope. Thus, in this example, a user can access a brief summary of all information across all applications and/or accounts associated with the computing device enabling the user to quickly scan the same. In this example, instead of scanning various news, social media, and communication (email, text, chat) applications, such a summary page could extract information associated with keywords singled out as having a particular relevance to a user and present this information in a single consolidated manner. For example, a user accessing the summary page of various embodiments may be presented with such information as "John just got back from vacationing in Hawaii", "Oil prices rise for the $5^{th}$ straight week", "Mom is expecting you at 6:30 pm tonight", "Joanna just changed jobs and is now financial analyst for XYZ Inc.", "Lunch with Obama and Hu Jintao at noon", and the like. In one embodiment, the individual bullet points, or summaries, presented on the summary page are selectable by a user to navigate the user to the originating account or content channel.

FIG. 4 illustrates an example screen shot 400 of an email 404 displayed on a display screen computing device 402, in accordance with at least one embodiment. Conventional emails are displayed with a "from" line that often includes the senders email address, a "to" line that includes the recipient's email, a "subject" line, and text of the body of the email. In this example, however, the email 404 includes a header portion 406 that includes the "from", "to", and "subject" lines and additionally a summary of a body 408 of the email 404. Further, in this example, a full text version of the body 408 is provided for display under the header portion 406. Thus, the user can quickly identify key points or information conveyed in the email 404 by reading the summary and, if the user wishes to be provided with more detail, can consult the full text version of the email body 408 displayed underneath.

Figure 5:
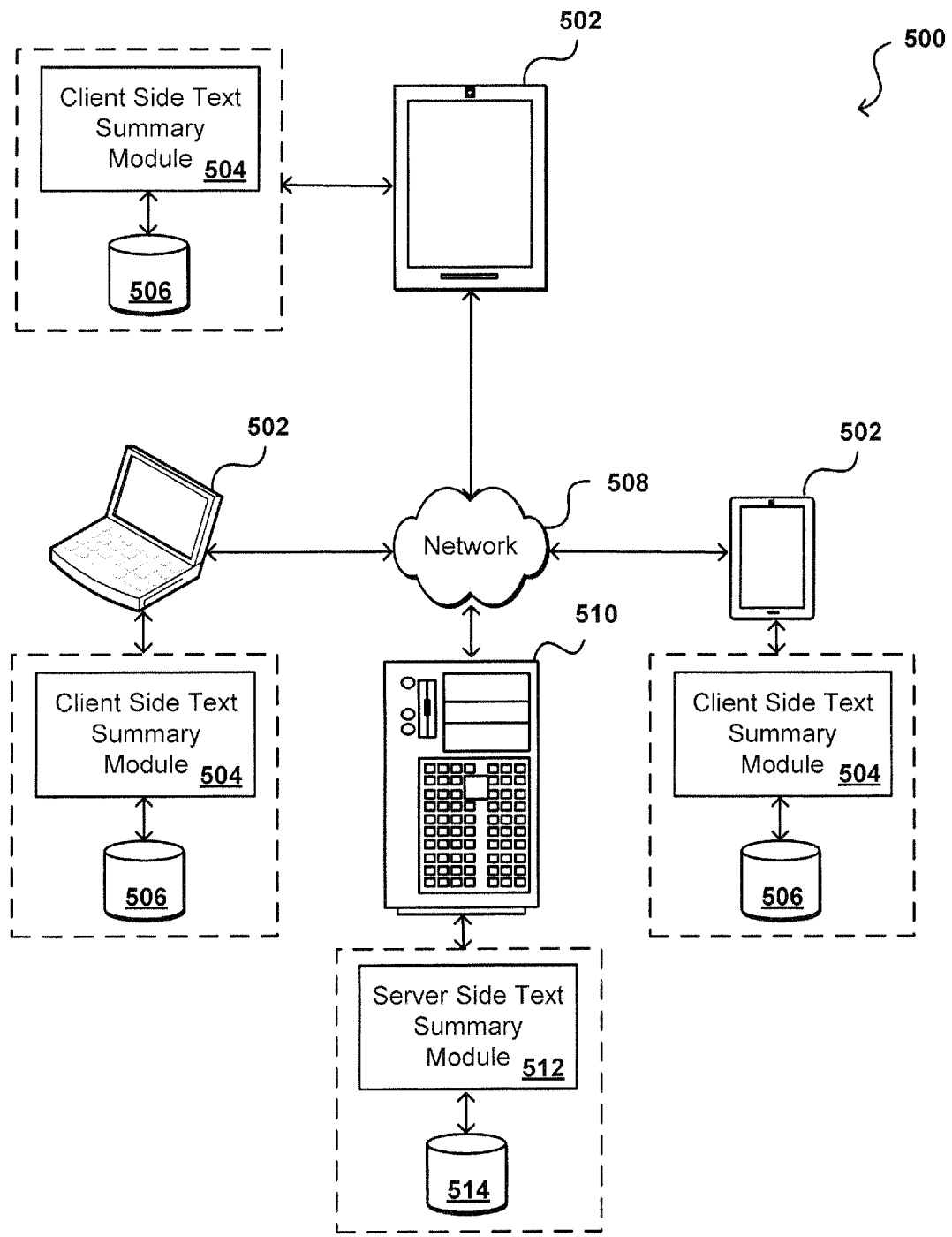
FIG. 5 illustrates an environment in which various embodiments can be implemented.

FIG. 5 illustrates an example of an environment 500 for implementing aspects in accordance with various embodiments. It should be understood that the example system provides a general overview of basic components, and that there can be many additional and/or alternative components utilized as known or used in the art for the generation, transmission, processing, management, and/or storage of electronic information. In this example, a user is able to utilize one or more client device(s) 502, such as a personal computer, tablet computer, smart phone, and the like, to access a one or more servers 510 over at least one appropriate network 508, such as a cellular network, the Internet, or another such network for communicating digital information.

The one or more servers 510 includes a server side text summary module 512 associated with database 514 and can, in various embodiments, generate summaries of appropriate lengths and provide the summaries to the client device 502. The one or more servers 510, when pushing or providing information, updates, or other content to the client device 502, may additionally provide the device with a summary of the information conveyed or contained therein for known applications. For example, a one line summary of an email for an inbox and a multiple line summary of the email for the header summary could be generated for each email as it is received by the server 510 from a $3^{rd}$ party service provider to be forwarded to the device 502. In this example, the $3^{rd}$ party service provider could also maintain the server 510. In some embodiments, a text summarizing application or client side text summary module 504 associated with local database 506 can be installed on the client device 502, such that much of the information gathering, summarizing, or other such aspects can be executed on the client device 502. In this example, the device 502 could generate summaries as information, such as emails, news updates, and the like, is received. Alternatively, or in addition, as information is received or pushed to the one or more device(s) 502, a device could forward the information to the server 510 to request the summaries. In some embodiments, default summaries could be automatically provided as a predetermined routine for certain information, data types, or particular applications. In this example, if text information not part of a predetermined routine is received, the device 502 could forward the information to the server 510 to request a summary of a particular length. Various other interaction and execution approaches can be utilized as well within the scope of the various embodiments.

Figure 6:
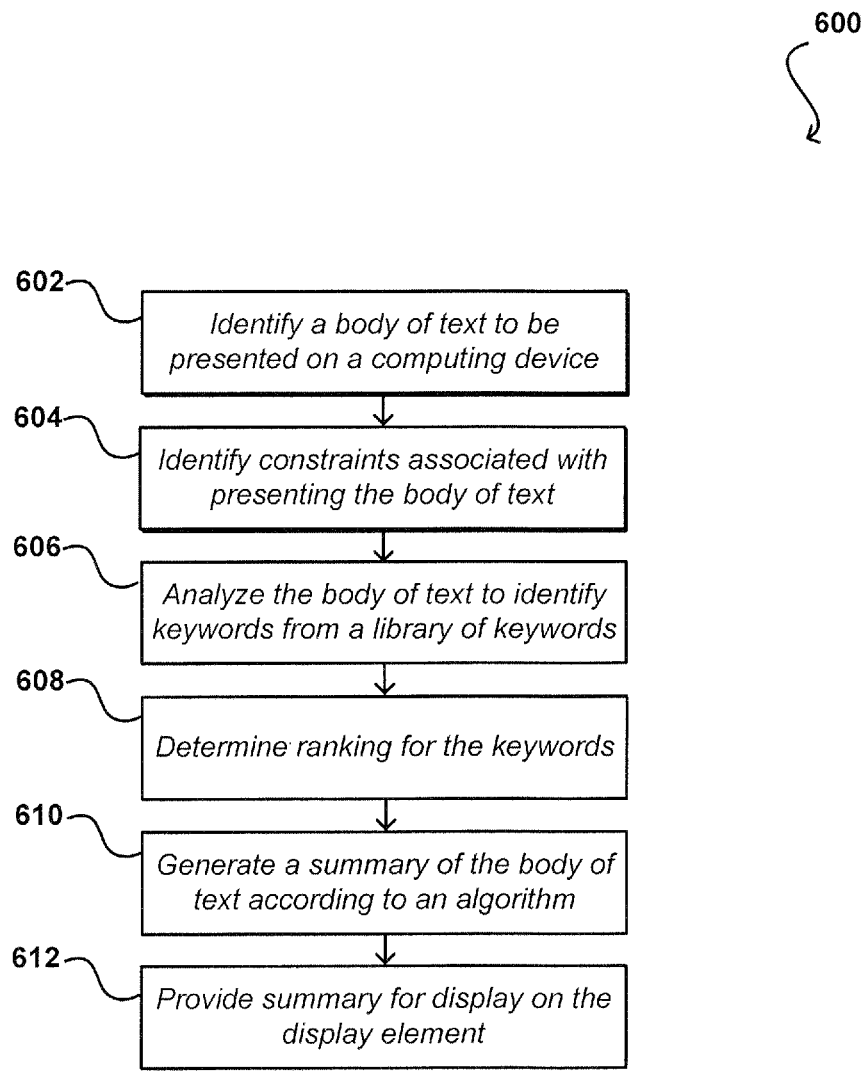
FIG. 6 illustrates an example process in accordance with various embodiments.

FIG. 6 illustrates an example process 600 for summarizing text and presenting the same to a user that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, a communication including a body of text, or other text content, to be presented on a computing device is identified or received 602. The received communication could be in the form of an email, a breaking news update, a friend's status update, and so on as described above. In this example, the body of text is analyzed to determine whether it meets at least one summarization criterion for a type of notification 604. In this example, the summarization criterion for a particular application includes display constraints, such as word count, font size, and any other factors limiting an amount of displayable text or content, and the notification could be a summary line in an email inbox, a notification for display on a lock-screen, or a notification on a separate summary page as described elsewhere herein. In this example, the body of text is analyzed to identify keywords from a library of action words 606 associated with topics, such as dates, action required, friends, family, events, and so on. The action words include a predetermined rank and are weighted by importance or relevance to these and other topics. As mentioned above, this ranking may change over time as life changes and new interests evolve for a particular user. Once keywords are identified, a relative ranking of the identified keywords is determined for the body of text based in part on the rank or weighting associated with each identified keyword from the library of action words 608. Subsequently, a summary is generated using the ranked identified keywords according to a text summary algorithm 610. In this example, the summary with the type of notification is provided for display on the display element of the computing device 612. Various other types of information and notifications can be utilized and provided as well within the scope of the various embodiments.

In various embodiments, the summaries are generated using any text summary method or algorithm to identify relevant portions of a body of text to display to a user. Text summary methods or algorithms search portions of text to identify keywords or words that imply an action, such as nouns or pronouns and verbs to identify key topics or actions associated with a body of text. This method of text summarization is known as an extractive method because the method selects a subset of existing words, phrases, or sentences from the original text and reduces the same down to those words, phrases, or sentences to form the summary. Extraction methods tend to copy the information deemed most important by the system or algorithm to the summary, such as keyword or phrases, while abstraction methods involve paraphrasing sections of the body of text. In one embodiment, a text summary method could include identifying a keyword(s) or action word(s) and incorporating a predetermined number of words before and/or after the keyword(s) or action word(s) as determined by a machine learning algorithm, for example. Various other types of information and techniques can be utilized as well within the scope of the various embodiments.

In one embodiment, the identified the keyword(s) or action word(s), such as verbs and nouns, can be pieced together to create the summaries. For example, from a voicemail, email, or text message, the message "Pick up mom at 5:30" could be pieced together by including the verb pick up, the noun mom, and the time. In another embodiment, a summary algorithm can be tipped off to important information based on the type of application the text comes from. For example, a body of text from a calendar application can tip off a text summary algorithm to the importance of a date, time, and location. Therefore, in this example, the algorithm can be more sensitive to keywords associated with a date, time, and location. This example can be extended to other applications or sources of information within the scope of various embodiments.

The text summary methods or algorithms may also include supervised and/or machine learning techniques. Supervised learning is a machine learning technique of inferring a summary from training data. A supervised learning algorithm, therefore, analyzes the training data and produces an inferred summary based thereon. The training data can consist of a set of training examples, such as literary work, a user's past communications, and the like. The training data can be determined by a technique called text mining which is a process of deriving information from various text sources. This information is typically derived through the devising of patterns and trends through means such as statistical pattern learning. Text mining usually involves the process of structuring the input text (usually parsing, along with the addition of some derived linguistic features and the removal of others, and subsequent insertion into a database), deriving patterns within the structured data, and finally evaluation and interpretation of the output. Typical text mining tasks include text categorization, text clustering, concept/entity extraction, production of granular taxonomies, sentiment analysis, document summarization, and entity relation modeling (i.e., learning relations between named entities). Analysis of this information involves information retrieval, lexical analysis to study word frequency distributions, pattern recognition, tagging/annotation, information extraction, data mining techniques including link and association analysis, visualization, and predictive analytics. This information can be used to train a text summary method or algorithm to pick out keywords, key components of sentences, and/or key sentences from a body of text.

Abstractive text summarization methods can also be used, in accordance with various embodiments. Abstractive methods build an internal semantic representation of the body of text and subsequently use natural language generation algorithms to generate the summaries. These methods tend to be closer to natural human language and often contain words not explicitly present in the original body of text. Various other methods, techniques, and approaches can be utilized as well or in combination within the scope of the various embodiments.

Figures 7A, 7B:
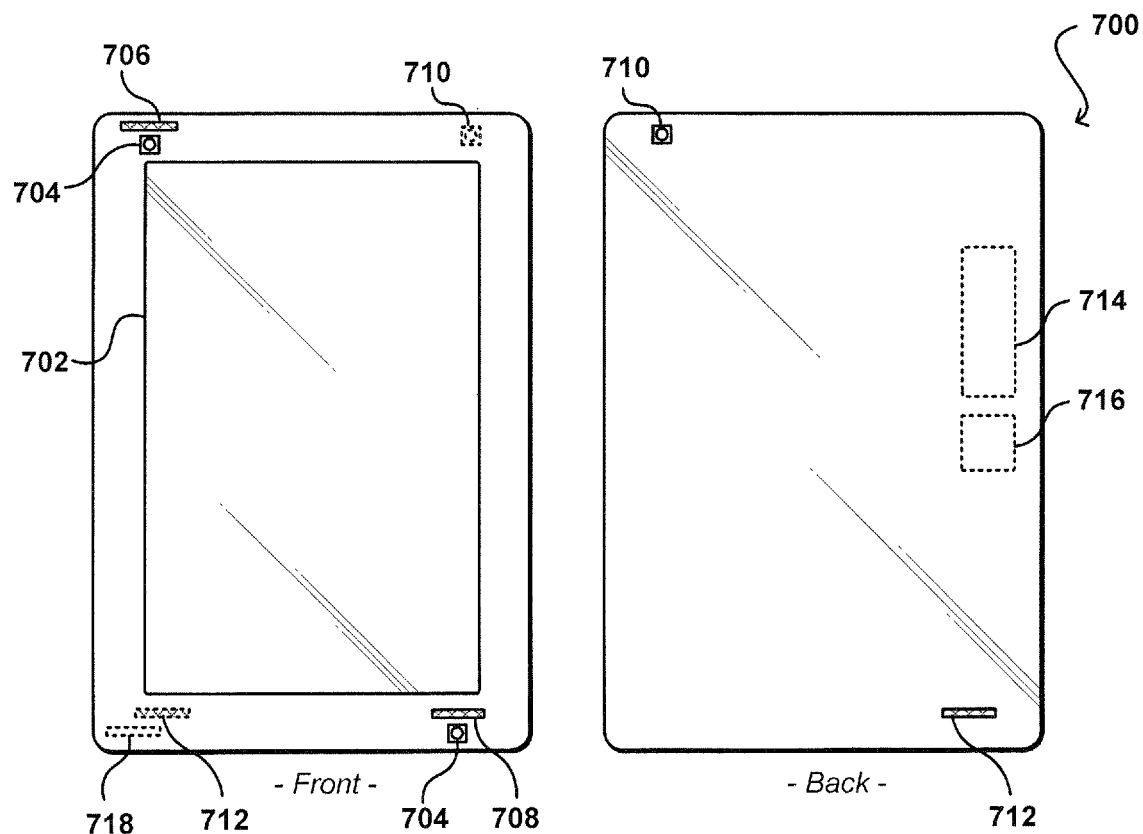
FIGS. 7A and 7B illustrate an example computing device that can be used to implement aspects of various embodiments.

FIGS. 7(a) and 7(b) illustrate front and back views, respectively, of an example electronic computing device 700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 700 has a display screen 702 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled device (CCD), a motion detection sensor or an infrared sensor, or other image capturing technology.

As discussed, the device can use the images (e.g., still or video) captured from the imaging elements 704 and 710 to generate a three-dimensional simulation of the surrounding environment (e.g., a virtual reality of the surrounding environment for display on the display element of the device). Further, the device can utilize outputs from at least one of the image capture elements 704 and 710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 708 on the front side, one microphone 712 on the back, and one microphone 706 on or near a top or side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, electronic gyroscopes, and electronic compasses.

The example device also includes at least one communication mechanism 714, such as may include at least one wired or wireless component operable to communicate with one or more computing devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

Figure 8:
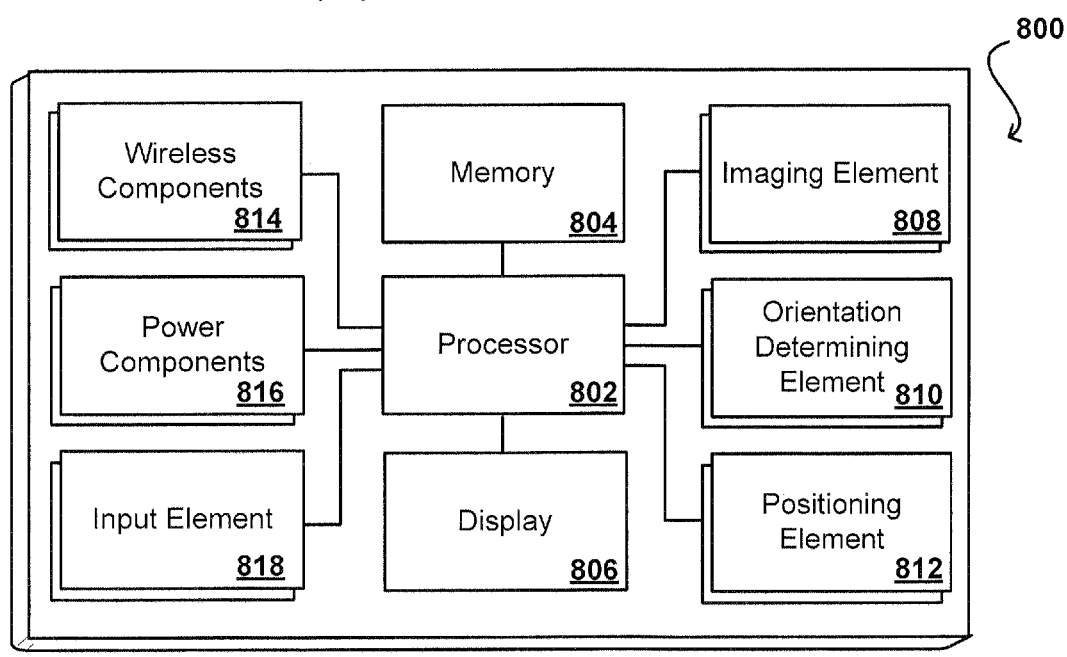
FIG. 8 illustrates example components that can be used with a device such as that illustrated in FIGS. 8A and 8B.

FIG. 8 illustrates a set of basic components of an electronic computing device 800 such as the device 700 described with respect to FIG. 7. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices.

The device typically will include some type of display element 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location).

Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more computing devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 9:
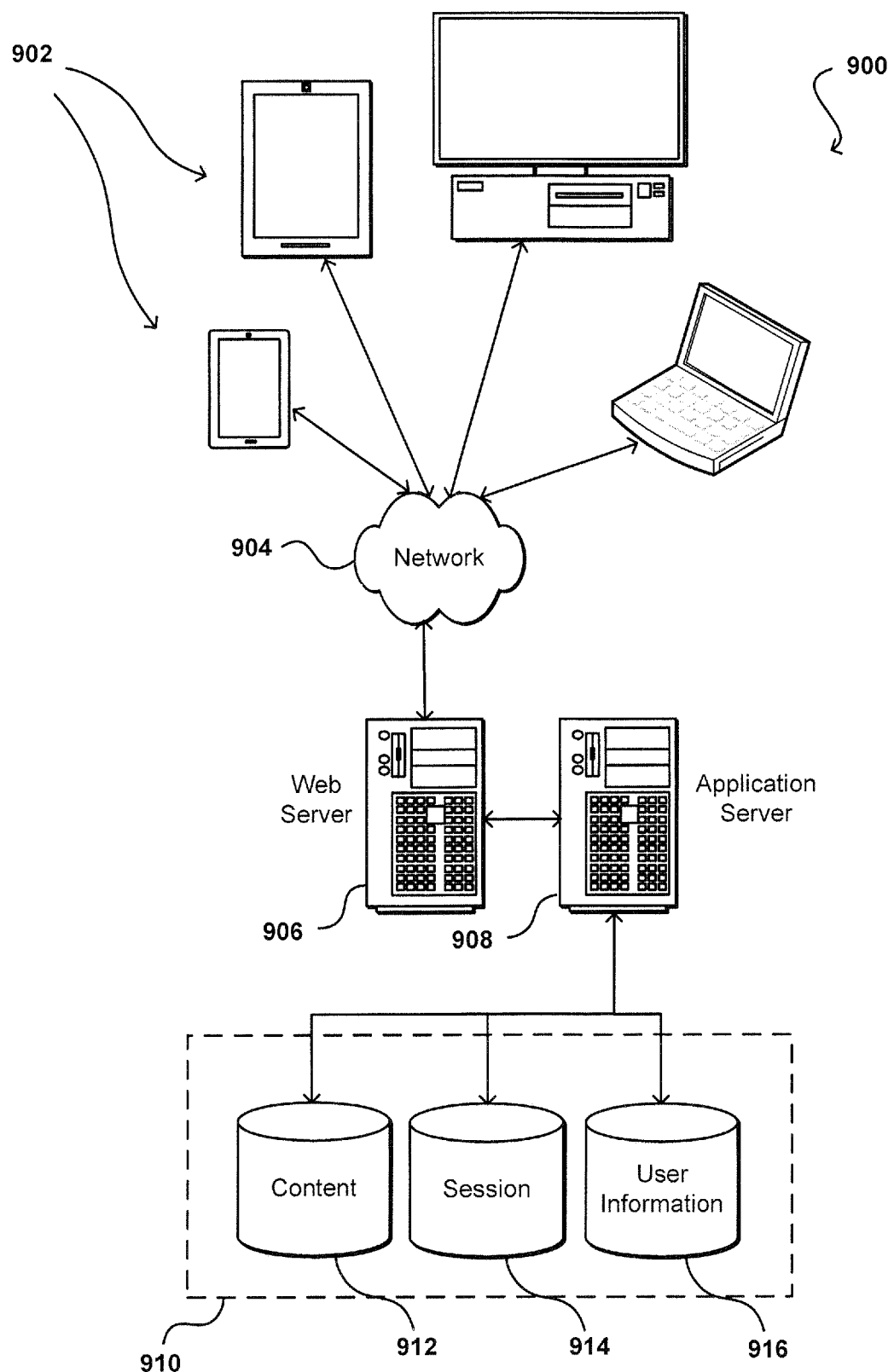
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an computing client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other computing devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving, by a computing device, a communication including text that is presentable on a display screen of the computing device;
   determining a portion of the communication to present on the display screen, the portion of the communication including a subset of and less than all words from the text;
   detecting a movement of the computing device from a first position to a second position;
   based at least in part on first data representing a position of a user with respect to the computing device, determining that the display screen is viewable when the computing device is in the second position; and
   in response to detecting the movement, presenting the portion of the communication on the display screen.

2. The computer-implemented method of claim 1, further comprising:
   presenting a plurality of excerpted communications from a same application as the communication on the display screen.

3. The computer-implemented method of claim 1, further comprising:
   presenting one or more excerpted communications from each of a plurality of applications on the display screen.

4. The computer-implemented method of claim 1, further comprising:
   adjusting a power level of the display screen based at least on a gaze of the user.

5. The computer-implemented method of claim 1, further comprising:
   translating voice data to the communication including text.

6. The computer-implemented method of claim 1, further comprising:
   presenting a plurality of excerpted communications in a sequence based on past relevance to the user.

7. The computer-implemented method of claim 1, further comprising:
   detecting an amount of ambient light in an environment of the computing device; and
   activating a dark mode for presenting content on the display screen based on the amount of ambient light.

8. A computing device, comprising:
   one or more processors;
   a display screen; and
   memory including instructions that, upon execution by the one or more processors, cause the computing device to:
      receive a communication including text that is presentable on the display screen of the computing device;
      determine a portion of the communication to present on the display screen, the portion of the communication including a subset of and less than all words from the text;
   detect a movement of the computing device from a first position to a second position;
   based at least in part on first data representing a position of a user with respect to the computing device, determine that the display screen is viewable when the computing device is in the second position; and
   in response to detecting the movement, present the excer$_p$ted amount portion of the communication on the display screen.

9. The computing device of claim 8, further comprising further instructions that, upon execution by the one or more processors, further cause the computing device to:
   present a plurality of excerpted communications from a same application as the communication on the display screen.

10. The computer-implemented method of claim 8, further comprising further instructions that, upon execution by the one or more processors, further cause the computing device to:
    present one or more excerpted communications from each of a plurality of applications on the display screen.

11. The computing device of claim 8, further comprising a camera and the memory including further instructions that, upon execution by the one or more processors, further cause the computing device to:
    capture, by the camera, image data of a field of view of the camera; and
    determine, from the image data, that an identity of a user of the computing device is represented in the image data.

12. The computing device of claim 8, further comprising further instructions that, upon execution by the one or more processors, further cause the computing device to:
   translate voice data to the communication including text.

13. The computing device of claim 8, further comprising further instructions that, upon execution by the one or more processors, further cause the computing device to:
   present a plurality of excerpted communications in a sequence based on past relevance to a user of the computing device.

14. The computing device of claim 8, further comprising further instructions that, upon execution by the one or more processors, further cause the computing device to:
   detect an amount of ambient light in an environment of the computing device; and activate a dark mode for presenting content on the display screen based on the amount of ambient light.

15. The computing device of claim 11, further comprising further instructions that, upon execution by the one or more processors, further cause the computing device to:
   adjust a power level of the display screen based at least on a gaze of the user.

\* \* \* \* \*